(12) United States Patent
Saito et al.

(10) Patent No.: US 10,591,647 B2
(45) Date of Patent: Mar. 17, 2020

(54) MARKER, METHOD FOR MANUFACTURING SAME, AND OPTICAL COMPONENT

(71) Applicant: Enplas Corporation, Saitama (JP)

(72) Inventors: Tomohiro Saito, Saitama (JP); Yuta Kawamoto, Saitama (JP); Yuya Oshima, Saitama (JP); Mitsuaki Shiota, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/761,242

(22) PCT Filed: Aug. 23, 2016

(86) PCT No.: PCT/JP2016/074441
§ 371 (c)(1),
(2) Date: Mar. 19, 2018

(87) PCT Pub. No.: WO2017/047334
PCT Pub. Date: Mar. 23, 2017

(65) Prior Publication Data
US 2018/0259683 A1   Sep. 13, 2018

(30) Foreign Application Priority Data

Sep. 18, 2015 (JP) ................. 2015-184894

(51) Int. Cl.
*G02B 3/06* (2006.01)
*G02B 3/00* (2006.01)
(Continued)

(52) U.S. Cl.
CPC .......... *G02B 3/0031* (2013.01); *B29C 45/372* (2013.01); *G02B 3/0037* (2013.01); *G02B 3/06* (2013.01); *B29L 2011/0016* (2013.01)

(58) Field of Classification Search
CPC .... G02B 3/0031; G02B 3/0037; G02B 3/005; G02B 3/0075; G02B 3/02; G02B 3/04; G02B 3/06; G02B 27/06
(Continued)

(56) References Cited

U.S. PATENT DOCUMENTS 6,414,794 B1    7/2002  Rosenthal
6,627,125 B1 *  9/2003  Nishikawa ............ B29C 39/023
                                                         264/1.38
(Continued)

FOREIGN PATENT DOCUMENTS

EP       2474424 A2     7/2012
JP       S58-173726 A   10/1983
(Continued)

OTHER PUBLICATIONS

International Search Report from International Application No. PCT/JP2016/074441 dated Nov. 22, 2016.
(Continued)

*Primary Examiner* — Darryl J Collins
(74) *Attorney, Agent, or Firm* — Brundidge & Stanger, P.C.

(57) ABSTRACT

A transparent resin is injection molded to create a marker (10) as an integrally molded article (lenticular lens portion (11)) including convex surfaces (112) and recesses (113) formed on the rear side of the convex surfaces. The recesses (113) are filled with coating films (115) formed by applying and curing a fluid coating material. Each recess (113) is arranged corresponding to a convex surface (112) so that the coating films (115) can be observed as optically distinguishable from the side of the convex surfaces (112).

16 Claims, 7 Drawing Sheets

(51) Int. Cl.
*B29C 45/37* (2006.01)
*B29L 11/00* (2006.01)

(58) Field of Classification Search
USPC ........ 359/619, 623, 626, 708, 710, 741–743
See application file for complete search history.

(56) References Cited

U.S. PATENT DOCUMENTS

| | | | |
|---|---|---|---|
| 2005/0018306 A1* | 1/2005 | Yoshida | G02B 3/0031 359/619 |
| 2008/0037131 A1* | 2/2008 | Steenblik | B44F 1/10 359/619 |
| 2009/0207488 A1 | 8/2009 | Akiyama | |
| 2012/0268819 A1 | 10/2012 | Commander et al. | |
| 2013/0003354 A1 | 1/2013 | Meis et al. | |
| 2014/0002906 A1 | 1/2014 | Shibuya | |
| 2014/0111639 A1 | 4/2014 | Tanaka et al. | |
| 2017/0115496 A1 | 4/2017 | Yumoto | |

FOREIGN PATENT DOCUMENTS

| | | |
|---|---|---|
| JP | H08-207160 A | 8/1996 |
| JP | 2002-350981 A | 12/2002 |
| JP | 2007-256748 A | 10/2007 |
| JP | 2008-292636 A | 12/2008 |
| JP | 2009-192875 A | 8/2009 |
| JP | 2009-255320 A | 11/2009 |
| JP | 2009-288508 A | 12/2009 |
| JP | 2012-145559 A | 8/2012 |
| JP | 2013-025043 A | 2/2013 |
| JP | 2013-509313 A | 3/2013 |
| JP | 2015-64552 A | 4/2015 |
| JP | 5743248 B1 | 7/2015 |
| JP | 5850552 B1 | 2/2016 |
| WO | 2012/124433 A1 | 9/2012 |

OTHER PUBLICATIONS

Extended European Search Report for EP16846205.9 dated Apr. 4, 2019.

* cited by examiner

MARKER, METHOD FOR MANUFACTURING SAME, AND OPTICAL COMPONENT

TECHNICAL FIELD

The present invention relates to a marker, a manufacturing method of the same, and an optical component.

BACKGROUND ART

As a marker (which is also called "indicator") that uses a combination of a convex lens part including a convex surface part and a pattern (mark), a marker including a lenticular lens and a coloring layer is known. In this lenticular lens, a plurality of cylindrical lenses are disposed parallel to each other, and the coloring layers are observed as images corresponding to the respective cylindrical lenses, whereby these images form the above-mentioned pattern.

When the marker is viewed from the side of the convex surface parts of the cylindrical lenses, the image of the pattern moves or deforms depending on the viewing positions. In the field of augmented reality (AR) and/or the field of robotics, the marker is useful as a marker for recognizing the position and/or the orientation of an object and the like, and for such a use, the arrangement of the pattern and the like are conventionally studied (see, e.g., PTL 1 and PTL 2).

CITATION LIST

Patent Literature

PTL 1
Japanese Patent Application Laid-Open No. 2013-025043
PTL 2
Japanese Patent Application Laid-Open No. 2012-145559

SUMMARY OF INVENTION

Technical Problem

Formation of the coloring layer by application (coating) of a coating material is advantageous from the viewpoint of simply producing the coloring layer. However, the acceptable error in the plane direction in formation of the coloring layer is generally as small as several micrometers. In view of this, the smaller the acceptable error, the coating of the coloring layer at a desired position becomes more difficult.

In addition, although the boundary of the coloring layer (coating film) formed by coating might be clear at a glance, the coating material might locally exude all over the boundary of the coated part. As a result, microscopically, multiple wavy portions might be formed at the boundary. Consequently the boundaries of the images that are observed through the convex surface parts might be blurred, and moreover, the clearness of the image of the pattern might be insufficient. In view of this, the pattern of the marker formed by coating has room for improvement in clearness of the image of the pattern that is observed through the convex surface parts.

An object of the present invention is to provide a marker which can be simply manufactured, and can achieve observation of clear patterns.

Solution to Problem

A marker according to embodiments of the present invention includes: a convex lens part made of a transparent resin and including a convex surface part disposed on a front surface side of the convex lens part, a first part disposed on a rear surface side of the convex lens part, and a second part disposed on the rear surface side, the first part being arranged corresponding to the convex surface part, the second part being a part other than the first part; and a coating film formed on one or both of the first part and the second part. The first part is a recess or a protrusion. In a cross section of the convex lens part, the recess includes a pair of walls located at opposite positions. In the cross section of the convex lens part, the protrusion includes a pair of edges located at opposite positions. The coating film is formed entirely between the pair of walls or entirely between the pair of edges in the recess or the protrusion.

In addition, a method of manufacturing the marker according to embodiments of the present invention includes: producing the above-mentioned convex lens part by injection molding with a transparent resin; and producing the coating film by applying a coating material to one or both of the first part and the second part.

In addition, an optical component according to embodiments of the present invention is the above-mentioned convex lens part.

Advantageous Effects of Invention

According to the present invention, the position and the boundary of the coating film in the marker is defined by the wall of the recess or the edge of the protrusion produced by injection molding. Therefore, exuding of the coating material at the boundary is not caused when the coating material is applied to the recess or the protrusion, and as a result, the shape of the boundary of the coating film is not deformed. Accordingly, the marker according to the present invention can be simply manufactured, and can achieve observation of clear patterns.

DESCRIPTION OF EMBODIMENTS

First Embodiment

Figure 1A:
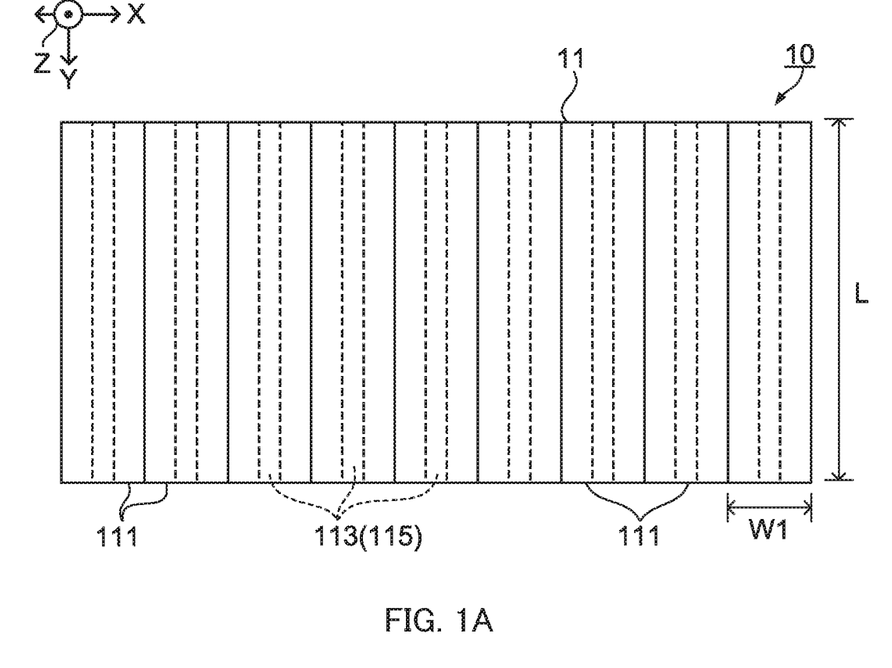
FIG. 1A is a plan view schematically illustrating a marker according to a first embodiment of the present invention, and FIG. 1B schematically illustrates a cross section of the marker.
Figure 1B:
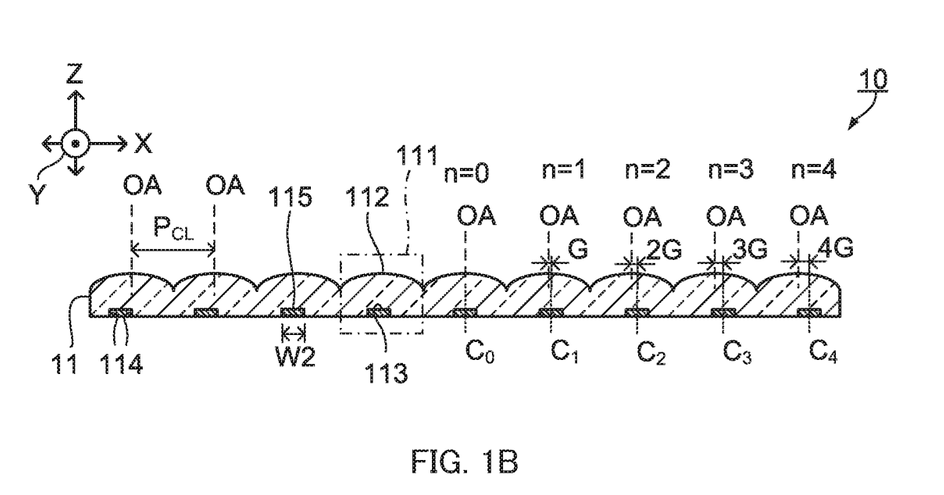

FIG. 1A is a plan view schematically illustrating marker 10 according to the first embodiment of the present invention, and FIG. 1B schematically illustrates a cross section of marker 10. As illustrated in FIGS. 1A and 1B, marker 10 includes lenticular lens part 11. It is to be noted that, in the drawings, X denotes one direction in a plane direction of the marker, Y denotes a direction orthogonal to the X direction in the plane direction, and Z denotes a direction (the thickness direction of the marker) orthogonal to both the X direction and the Y direction.

Lenticular lens part 11 is an integrally molded article of a plurality of parallel cylindrical lens parts 111, and has a rectangular planar shape. Lenticular lens part 11 is an optical component composed of a transparent resin such as polycarbonate and acrylic resin, for example.

Each cylindrical lens part 111 is a convex lens part that includes, on the front surface side thereof, convex surface part 112 that is a cylindrical surface whose apex is a ridgeline along the Y direction. Cylindrical lens parts 111 are arranged along the X direction such that their ridgelines are parallel to each other.

Cylindrical lens parts 111 have the same size. For example, each cylindrical lens part 111 has width W1 (the length in the X direction) of 370 µm and length L (the length in the Y direction) of 3 mm, and pitch $P_{CL}$ of cylindrical lens parts 111 is 370 µm. The pitch is a distance between the ridgelines (or, optical axes OA) of cylindrical lens parts 111 adjacent to each other in the X direction, and is a length of each cylindrical lens part 111 in the X direction. Optical axis OA of cylindrical lens part 111 is a straight line that extends along the Z direction and passes through the ridgeline.

In a cross section taken along the XZ plane, convex surface part 112 may have a shape of a spherical surface or an aspherical surface. The aspherical surface is a curved surface other than a spherical surface, and is a curved surface in which spherical surfaces of different curvatures are connected together, for example. Preferably, the aspherical surface is a curved surface whose curvature radius increases as the distance thereof from optical axis OA of cylindrical lens part 111 increases. That is, since optical axis OA of cylindrical lens part 111 is a plane that expands in the YZ direction, is it preferable that the aspherical surface be a curved surface whose curvature radius increases as the distance thereof from optical axis OA increases in the X direction.

Each cylindrical lens part 111 includes, on the rear surface side thereof, recess 113 corresponding to convex surface part 112. On the rear surface of each cylindrical lens part 111, portions other than recess 113 are flat, and are protrusions with respect to recess 113. Recess 113 corresponds to a first part, and the protrusion corresponds to a second part.

The cross-sectional shape of recess 113 taken along the X direction is rectangular. To be more specific, in the cross section taken along the X direction, recess 113 includes a pair of walls 114 located at opposite positions. The wall surfaces of walls 114 are perpendicular to the rear surface of cylindrical lens part 111 (the second part).

It is to be noted that each protrusion includes a pair of edges located at opposite positions. Also, the cross-sectional shape of the protrusion in the X direction is rectangular.

In plan view, recess 113 has a rectangular shape whose longitudinal direction is the Y direction. For example, in the Y direction, the length of recess 113 is equal to the length of cylindrical lens part 111. In addition, from a view point of achieving a desired function (image indication) and the ease of application of the coating material, the depth of recess 113 (from the second part) may be set within a range of 10 to 100 µm, and is 10 µm, for example.

Width (the length in the X direction) W2 of recess 113 is 45 µm, for example. When width W2 of recess 113 is small relative to $P_{CL}$, the contrast of the image that is observed at convex surface part side 112 of lenticular lens part 11 described later tends to be large, whereas when width W2 of recess 113 is large relative to $P_{CL}$, production of recess 113 and coating film 115 described later tends to be eased. Preferably, the ratio of width W2 of recess 113 to pitch $P_{CL}$ (W2/$P_{CL}$) is 1/100 to 1/5 from the viewpoint of obtaining a sufficiently clear image. It is to be noted that the pitch is a center-to-center distance between recesses 113 adjacent to each other in the X direction.

Recesses 113 of cylindrical lens parts 111 are disposed at respective positions where the images of recesses 113 are observed at a center of lenticular lens part 11 in the X direction when marker 10 is observed at a center of lenticular lens part 11 in the X direction from convex surface part 112 side.

For example, recess 113 of cylindrical lens part 111 located at the center of lenticular lens part 11 in the X direction (cylindrical lens part 111 of n=0 in FIG. 1B) is disposed at a position where center $C_0$ thereof overlaps optical axis OA of cylindrical lens part 111 of n=0.

The center-to-center distance ($|C_n - C_{n-1}|$) between recesses 113 of cylindrical lens parts 111 adjacent to each other in the X direction is represented by $P_{CL}$+nG µm. $P_{CL}$ represents a distance between the ridgelines of cylindrical lens parts 111 adjacent to each other in the X direction as described above, G represents a predetermined distance (e.g., 8 µm) from the $P_{CL}$ in the X direction to obtain desired optical effects of the image, and n represents the order of cylindrical lens parts 111 in the X direction with cylindrical lens part 111 at the center being set to 0th.

In this manner, as the distance from cylindrical lens part 111 of the center (n=0) increases, the positions of recesses 113 of cylindrical lens parts 111 are more shifted outward of the optical axes OA of respective cylindrical lens parts 111 in the X direction.

Coating film 115 is formed in recess 113. Coating film 115 is formed entirely between the pair of walls 114 in recess 113. Coating film 115 is a solidified black liquid coating material, for example.

Coating film 115 is a film that is produced through application and solidification of a coating material. The coating material has fluidity, and is a liquid composition or powder, for example. The method of application and solidification of the coating material may be appropriately selected from publicly known methods in accordance with the coating material. For example, examples of the application method of the coating material include spray coating and screen printing. Examples of the solidification method of the coating material include drying of a liquid coating material, curing of a curable composition (such as radical polymerizable compound) in the coating material, and baking of powder.

Coating film 115 forms an optically discriminable portion. Here, "optically discriminable" means that coating film 115 and another portion has evident difference in their optical characteristics. "Optical characteristics" are, for example, the degrees of the color such as brightness, saturation and hue, or the optical intensity such as luminance "Difference" may be appropriately set in accordance with the use of the marker, and may be a difference which can be visually checked, or a difference which can be confirmed with an optical detection apparatus, for example. In addition, the difference may be a difference which can be directly detected from coating film 115, or a difference which can be detected through an additional operation such as irradiation of an UV lamp as in the case where coating film 115 is a transparent film that emits fluorescence, for example.

Figure 2:
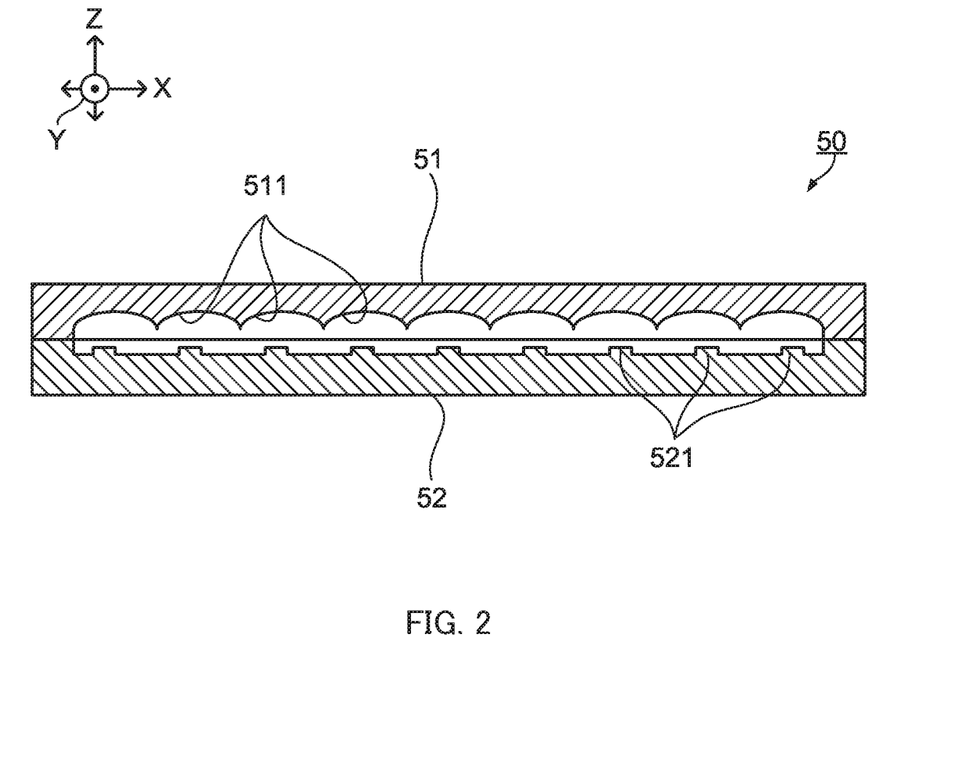
FIG. 2 schematically illustrates a cross section of a metal mold for manufacturing a lenticular lens part of the marker by injection molding.

Marker 10 is manufactured by the following method. FIG. 2 schematically illustrates a cross section of a metal mold for manufacturing lenticular lens part 11 of marker 10 by injection molding.

First, lenticular lens part 11 is produced by injection molding with a transparent resin. The injection-mold article of lenticular lens part 11 is produced using metal mold 50 illustrated in FIG. 2. Metal mold 50 is composed of upper mold 51 and lower mold 52. Upper mold 51 includes recessed lines 511 corresponding to the shapes of the convex surface parts. Lower mold 52 includes projected lines 521 corresponding to recesses 113. Through this process, lenticular lens part 11 including convex surface parts 112 on the front surface side and recesses 113 on the rear surface side can be obtained as an integrally molded article of a transparent resin.

Next, coating film 115 is produced by applying a coating material to recess 113. Through this process, the coating material is supplied to the entirety recess 113 or to a predetermined level of recess 113, and then the coating material is solidified. As a result, coating film 115 that has a thickness equal to the level of the supplied coating material and covers the bottom surface of recess 113 is produced in recess 113.

When marker 10 is placed on a white object, light which is incident on cylindrical lens part 111 and reaches recess 113 is absorbed by coating film 115, and light which is incident on cylindrical lens part 111 and reaches other parts (the second part or the protrusion) is generally reflected by the surface of the object. As a result, in convex surface part 112, an image of the black line of coating film 115 is projected on the white background.

Since recesses 113 are appropriately disposed in accordance with their distances from the center of marker 10 in the X direction, a black aggregation image that is an aggregation of the images of the black lines is observed in the entirety of lenticular lens part 11 when marker 10 is observed from the front surface side of lenticular lens part 11.

For example, when marker 10 is viewed from the center of lenticular lens part 11 in the X direction, the black aggregation image is observed at a center portion in the X direction. When marker 10 is observed from a different angle in the XZ plane, the aggregation image is observed at a different position in the X direction corresponding to the angle. That is, the angle of the observation position of marker 10 in the XZ plane is determined based on the position of the aggregation image in the X direction. In this manner, marker 10 functions as the above-described marker.

Recess 113 of marker 10 is formed simultaneously with convex surface part 112 by injection molding of lenticular lens part 11. In this manner, the position of recess 113 with respect to convex surface part 112 and the shape of recess 113 are precisely set by the metal mold used for the injection molding.

Further, coating film 115 is formed by supplying a sufficient amount of coating material to recess 113. In this manner, coating film 115 is formed entirely between the pair of walls 114 in recess 113, and the boundary between coating film 115 (the first part) and other parts (the second part) is defined by the surface of wall 114 of recess 113. Accordingly, when coating film 115 is viewed along the Z direction, the boundary of coating film 115 matches the shape of the surface of wall 114 viewed along the Z direction.

With this configuration, since no exuding of the coating material in the X direction is caused at the boundary, the image of the black line that is observed in each cylindrical lens part 111 is more thin and more intense, and also, the aggregation image that is observed in lenticular lens part 11 is more dense and more intense, and in turn, clearer in comparison with the case where the boundary of the coating film includes microscopic irregular shapes resulting from exuding of the coating material.

Second Embodiment

Figure 3:
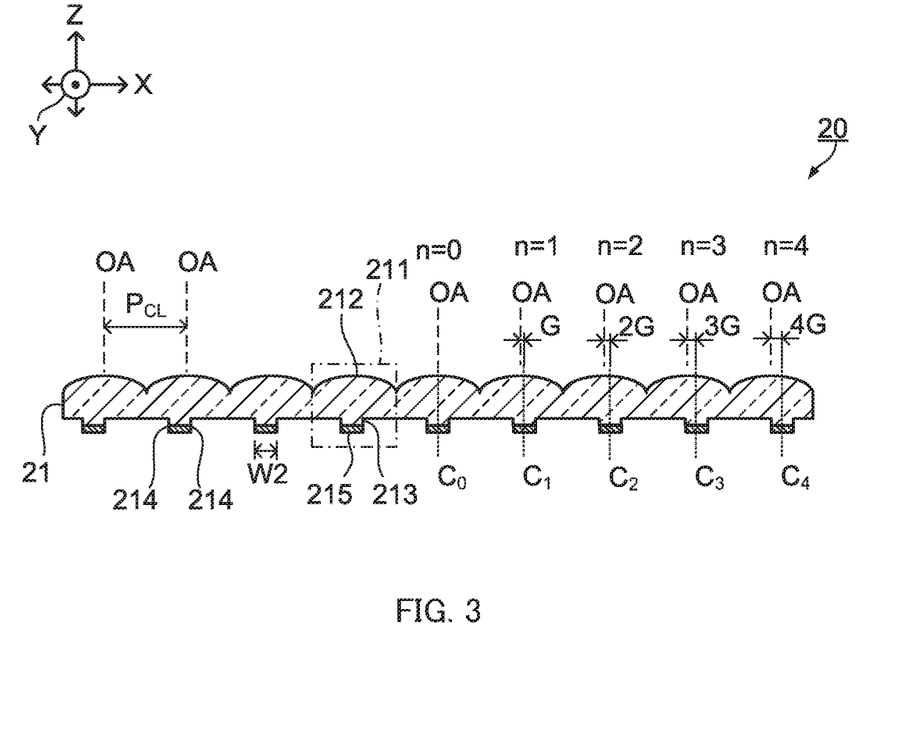
FIG. 3 schematically illustrates a cross section of a marker according to a second embodiment of the present invention.

FIG. 3 schematically illustrates a cross section of marker 20 according to the second embodiment of the present invention. As illustrated in FIG. 3, the configuration of marker 20 is identical to that of marker 10 except in that the first part is protrusion 213 and that the second part is a recess with respect to the first part.

That is, in marker 20, lenticular lens part 21 is an integrally molded article of a plurality of parallel cylindrical lens parts 211. The cross-sectional shape and the planar shape of protrusion 213 are identical to those of recess 113. Protrusion 213 includes a pair of edges 214 located at opposite positions of the projecting surface thereof in the X direction.

Coating film 215 is formed entirely between edges 214 on the projecting surface of protrusion 213. Edge 214 of protrusion 213 is a boundary portion between the projecting surface and the side wall surface of protrusion 213, and generates a surface tension enough to retain liquid at the projecting surface, for example. From a view point of achieving a desired function (image indication) and the ease of application of the coating material, the height of protrusion 213 (the second part) may be set within a range of 10 to 100 μm, and is 10 μm, for example. Also, marker 20 is manufactured by producing an integrally molded article including convex surface part 212 and protrusion 213 by injection molding with an appropriate metal mold, and then by applying a coating material to the projecting surface of protrusion 213 of the integrally molded article to provide coating film 215 on the projecting surface.

The position of protrusion 213 with respect to convex surface part 212 and the shape of protrusion 213 in marker 20 are precisely set by the metal mold used for the injection molding. Thus, when coating film 215 is viewed along the Z direction, the boundary between coating film 215 and the second part matches the shape of edge 214 viewed along the Z direction. Accordingly, in marker 20 as well as in marker 10, the image of the black line that is observed in each cylindrical lens part 211 is more thin and more intense, and also, the aggregation image that is observed in lenticular lens part 21 is more dense and more intense, and in turn, clearer in comparison with the case where the boundary of the coating film includes microscopic irregular shapes.

Third Embodiment

Figure 4A:
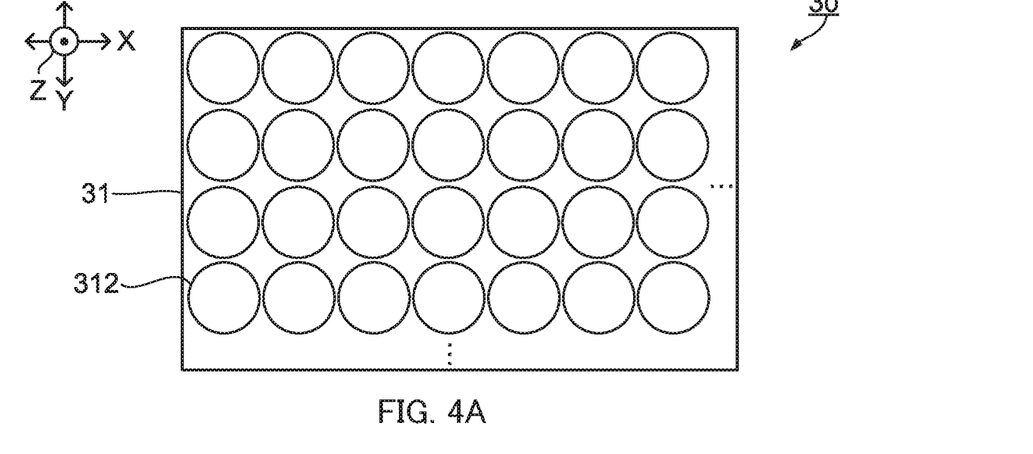
FIG. 4A is a plan view schematically illustrating a marker according to a third embodiment of the present invention, FIG. 4B schematically illustrates a cross section of the marker, and FIG. 4C schematically illustrates a bottom surface of the marker.
Figure 4B:
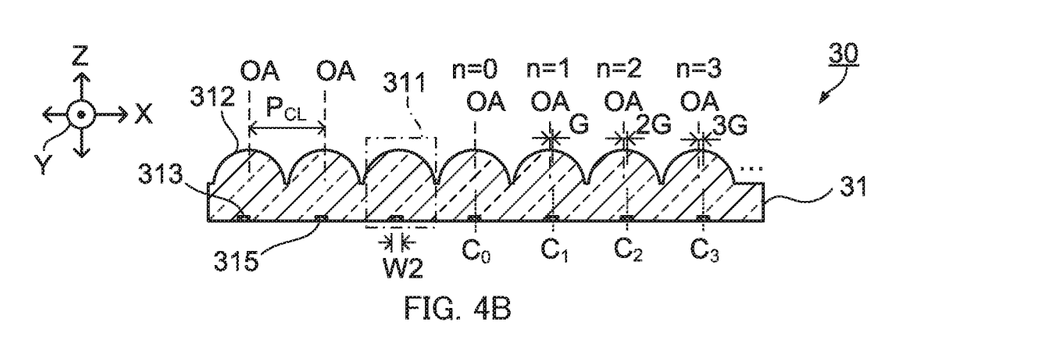
Figure 4C:
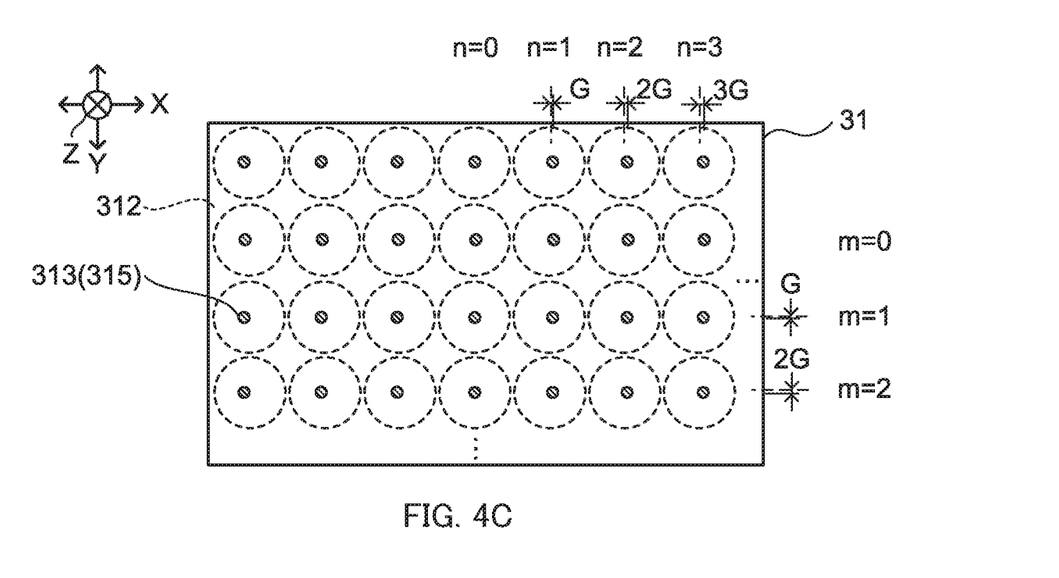

FIG. 4A is a plan view schematically illustrating marker 30 according to the third embodiment of the present invention, FIG. 4B schematically illustrates a cross section of marker 30, and FIG. 4C schematically illustrates a bottom surface of marker 30. Marker 30 includes convex lens group 31.

Convex lens group 31 is an optical component composed of an injection-molded article of a transparent resin. Convex lens group 31 is an assembly of a plurality of convex lens parts 311, and is an integrally molded article which has a rectangular planar shape. In the plane direction, convex lens group 31 includes 376 convex lens parts 311 in total, specifically, 47 convex lens parts 311 in the X direction and 8 convex lens parts 311 in the Y direction.

Each convex lens part 311 includes convex surface part 312 on the front surface side thereof. Convex surface parts 312 have circular planar shapes and the same size. For example, the diameter of the planar shape of convex surface part 312 is 350 μm, and pitch $P_{CL}$ of convex surface parts 312 is 370 μm in each of the X direction and the Y direction. Pitch $P_{CL}$ of convex surface parts 312 is a center-to-center distance of convex surface parts 312 adjacent to each other.

Also, the cross-sectional shape of convex surface part 312 may be a spherical surface or an aspherical surface, and preferably, the aspherical surface is a curved surface whose curvature radius increases as the distance thereof from optical axis OA of convex lens part 311 increases. That is, since optical axis OA of convex lens part 311 is a straight line parallel to the Z direction, it is preferable that the aspherical surface be a curved surface whose curvature radius increases as the distance thereof from optical axis OA of convex lens part 311 increases in the direction along the XY plane.

In addition, each convex lens part 311 includes, on the rear surface side thereof, recess 313 disposed at a position corresponding to convex surface part 312. For example, recess 313 has a circular planar shape, a diameter of 45 μm, and a depth of 10 μm. In addition, recess 313 has a rectangular cross sectional shape in each of the X direction and the Y direction.

The center-to-center distance ($|C_n-C_{n-1}|$) between recesses 313 adjacent to each other in the X direction is $P_{CL}$ nG μm, and the center-to-center distance ($|C_m-C_{m-1}|$) between recesses 313 adjacent to each other in the Y direction is $P_{CL}$+mG μm. As described above, n represents the order of convex surface parts 312 in the X direction with a particular convex surface part 312 being set to 0th. In addition, m represents the order of convex surface parts 312 in the Y direction with a particular convex surface part 312 being set to 0th.

Coating film 315 is housed in each recess 313. Coating film 315 is formed to cover the bottom surface of recess 313. In this manner, in recess 313, coating film 315 is formed entirely between the walls of recess 313.

When marker 30 is observed from convex surface part 312 side, an aggregation of images of black spots of coating films 315 projected to convex surface parts 312 is observed. The position of this aggregation image changes in accordance with the viewing angle from convex surface part 312 side. With this configuration, marker 30 is used as a marker for rotation angle in which an image moves in the plane direction in accordance with the viewing angle.

The position of recess 313 with respect to convex surface part 312 and the shape of recess 313 are precisely set by the metal mold used for the injection molding as in the lenticular lens part 11. Thus, when coating film 315 is viewed along the Z direction, the boundary between coating film 315 and other portions (the second part) matches the shape of the wall surface of recess 313 viewed along the Z direction. Accordingly, in marker 30 as well as in markers 10 and 20, the image of the black spot that is observed in each convex surface part 312 is smaller and more intense, and also, the aggregation image that is observed in convex lens group 31 is more dense and more intense, and in turn, clearer in comparison with the case where the boundary of the coating film includes microscopic irregular shapes.

It is to be noted that the planar shape of convex surface part 312 may be a rectangular shape as well as the circular shape, and may be appropriately set as long as the shape functions as a convex lens. In addition, recess 313 may be replaced by a protrusion. Also, the planar shape of recess 313 may be shapes other than the circular shape, and may be a rectangular shape, for example.

(Modifications)

FIGS. 5A to 5F schematically illustrate cross-sectional shapes of recesses in markers according to other embodiments of the present invention. In addition, FIGS. 6A and 6B schematically illustrate states where a coating film is formed in the recess illustrated in FIG. 1B, and FIGS. 6C and 6D schematically illustrate states where a coating film is formed in the recess illustrated in FIG. 5F.

Figure 5A:
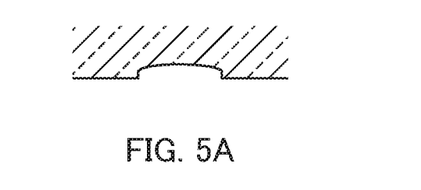
FIGS. 5A to 5F schematically illustrate cross-sectional shapes of recesses of markers according to other embodiments of the present invention.
Figure 5B:
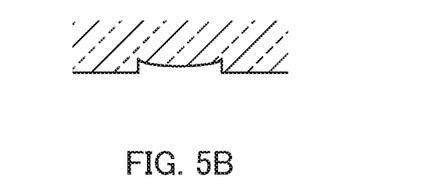
Figure 5C:
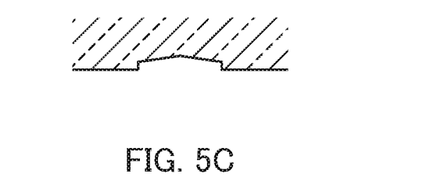

The cross-sectional shape of the recess that serves as the first part may have, as well as the rectangular shape, a shape with wall surfaces perpendicular to the rear surface of the convex lens part and a recessed curved bottom surface recessed with respect to the opening of the recess as illustrated in FIG. 5A, a shape with wall surfaces perpendicular to the rear surface of the convex lens part and a convex bottom surface that protrudes with respect to the opening of the recess as illustrated in FIG. 5B, or a shape with wall surfaces perpendicular to the rear surface of the convex lens part and a tapered bottom surface that is tilted in a direction away from the opening of the recess toward the center of the bottom surface of the recess as illustrated in FIG. 5C.

Figure 6A:
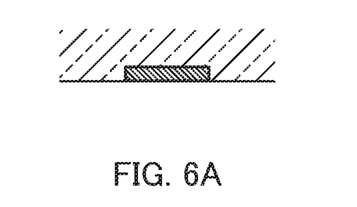
FIGS. 6A and 6B schematically illustrate states where a coating film is formed in the recess illustrated in FIG. 1B, and FIGS. 6C and 6D schematically illustrate states where a coating film is formed in the recess illustrated in FIG. 5F.
Figure 6B:
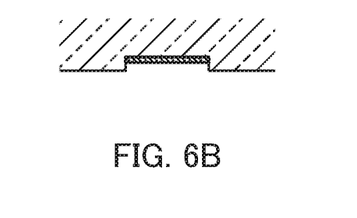
Figure 6C:
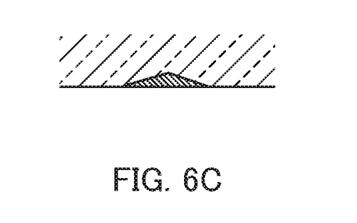
Figure 6D:
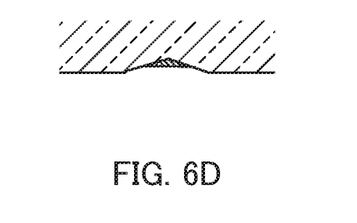

With the recesses having the above-mentioned cross-sectional shapes, clearer image can be indicated as a marker by forming a coating film entirely between opposite walls as illustrated in FIG. 6A or FIG. 6B. In addition, when the surface of the coating film is located at the perpendicular wall in the depth direction of the recess (the Z direction), the size of the coating film in the plane direction (e.g., W2) is constant. With this configuration, the width of the coating film as viewed in the Z direction is constant regardless of the thickness of the coating film, and the width of the line image that is projected to the convex surface part is constant. Further, as illustrated in FIG. 6A, when the recess is filled with the coating material up to the opening, and the coating material is then dried and solidified, the thickness of the coating film can be increased and made constant. Accordingly, the configuration is advantageous from the viewpoint of indicating more intense and clearer image as a marker.

Figure 5D:
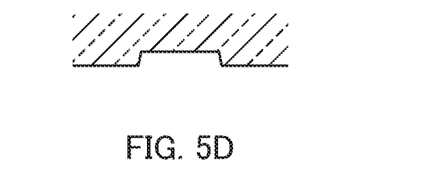
Figure 5E:
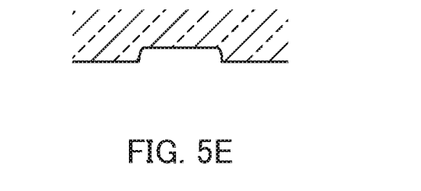
Figure 5F:
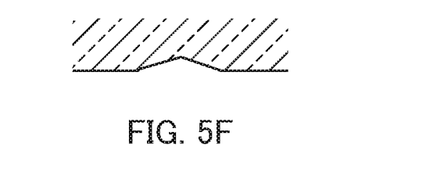

In addition, the cross-sectional shape of the recess that serves as the first part may be a shape with wall surfaces linearly and obliquely tilted to the rear surface of the convex lens part and a flat bottom surface as illustrated in FIG. 5D, or a shape with curved wall surfaces obliquely tilted to the rear surface of the convex lens part and a flat bottom surface as illustrated in FIG. 5E. Further, the cross-sectional shape of the recess that serves as the first part 113 may be a shape composed only of tapered wall surfaces linearly and obliquely tilted to the rear surface of the convex lens part as illustrated in FIG. 5F.

Also with the recesses having the above-mentioned cross-sectional shapes, when the recess are filled with the coating material to form the coating film, the coating film is formed entirely between the opposite walls, and a clear image can be indicated. For example, when the coating film is formed in the entirety of the recess illustrated in FIG. 5F as illustrated in FIG. 6C, the boundary of the coating film is defined by the edge of the opening of the recess. In addition, when the coating film is formed to a middle of the recess of FIG. 5F as illustrated in FIG. 6D, the boundary of the coating film is defined by the wall surface (tilted surface) of the recess and the liquid surface of the coating material by leveling of the coating material in the recess. In this case, practically, the coating material does not exude by going up the wall surfaces since the wall surfaces are tilted surfaces. Accordingly, a sufficiently clear image is indicated as a marker. That is, the wall of the recess may be a tilted surface, or the recess may be composed only of a wall.

Figure 7A:
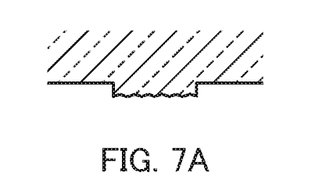
FIGS. 7A to 7F schematically illustrate cross-sectional shapes of protrusions of markers according to yet other embodiments of the present invention.
Figure 7B:
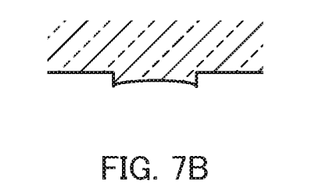
Figure 7C:
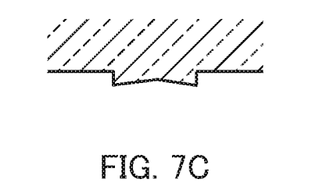
Figure 7D:
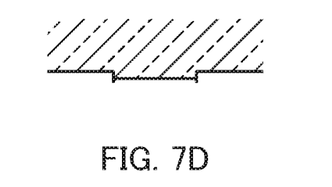

FIGS. 7A to 7F schematically illustrate cross-sectional shapes of protrusions of markers according to yet other embodiments of the present invention. In addition to the rectangular shape, the cross-sectional shape of the protrusion that serves as the first part may be a shape with wall surfaces raised perpendicularly from the rear surface of the convex lens part and a roughened top surface parallel to the rear surface as illustrated in FIG. 7A, a shape with wall surfaces raised perpendicularly from the rear surface of the convex lens part and a curved top surface recessed toward the center as illustrated in FIG. 7B, a shape with wall surfaces raised perpendicularly from the rear surface of the convex lens part and a tapered top surface recessed and tilted toward the center as illustrated in FIG. 7C, or a shape with wall surfaces raised perpendicularly from the rear surface of the convex lens part, a peripheral wall curved and recessed from the wall surface toward the center of the protrusion, and a flat surface that is surrounded by the peripheral wall as illustrated in FIG. 7D.

In the protrusions having the above-mentioned cross-sectional shapes, an edge that surrounds the top surface is formed, and the coating material is applied to the top surface, whereby the boundary of the coating film is defined by the edge. Accordingly, clearer image can be indicated as a marker. The protrusion illustrated in FIG. 7A is preferable from the viewpoint of increasing the adhesion of the coating film to the protrusion. A configuration in which a recess is formed on the top surface as in the protrusions illustrated in FIGS. 7B to 7D can achieve a large thickness of the coating film and is therefore advantageous from the viewpoint of indicating more intense and clearer image as a marker.

Figure 7E:
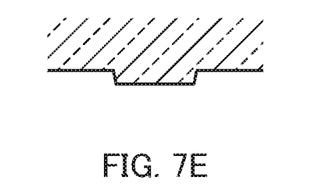
Figure 7F:
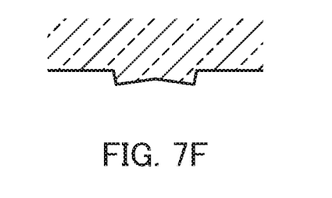

In addition, the cross-sectional shape of the protrusion that serves as the first part may be a shape with wall surfaces obliquely raised from the rear surface of the convex lens part and a top surface parallel to the rear surface as illustrated in FIG. 7E, or a shape with wall surfaces obliquely raised from the rear surface of the convex lens part and a recessed tapered top surface tilted toward the center as illustrated in FIG. 7F.

Also in the protrusions having the above-mentioned cross-sectional shapes, an edge that surrounds the top surface is formed, and the boundary of the coating film formed on the top surface is defined by the edge. Accordingly, a clearer image can be indicated as a marker.

In addition, as described above, the coating film may be formed only in the first part (the recess or the protrusion), and an additional coating film that is optically discriminable from the coating film of the first part may be formed in the second part. Formation of an additional coating film in the second part is advantageous in view of increasing the contrast of the aggregation image that is observed in the marker. In addition, in the case where a plurality of arranged markers are used, the markers can be identified from the observed aggregation image and the background. The marker whose second part is provided with an additional coating film is produced by applying a second coating material to the second part or the entirety of the rear surface of the convex lens part after the first coating material is applied to the first part, for example.

While the first part is a recess or a protrusion formed on the rear side of the convex surface part in the above-mentioned marker, the parts other than the recess or the protrusion, that is, the second part in the embodiments may be set to the first part, and the coating film may be formed thereto. In this case, the aggregation image of the marker is detected as the color of the background of the marker that is surrounded by the region of the color of the coating film.

In addition, a configuration in which the surface of the first part and the second part where the coating film is to be formed is roughened, which is not limited to the configuration of the protrusion illustrated in FIG. 7A, is further advantageous from the viewpoint of increasing application and adhesion of the coating material to one or both of the first part and the second part. The roughening of the surface can be performed by a common roughening process such as a blast process, and the desirable roughness of the surface is 1 to 10 μm in arithmetic average roughness Ra from the above-mentioned view point, for example.

(Effect)

As described above, a marker according to the present embodiments includes: a convex lens part made of a transparent resin and including a convex surface part disposed on a front surface side of the convex lens part, a first part disposed on a rear surface side of the convex lens part, and a second part disposed on the rear surface side, the first part being arranged corresponding to the convex surface part, the second part being a part other than the first part; and a coating film formed on one or both of the first part and the second part. The first part is a recess or a protrusion. In a cross section of the convex lens part, the recess includes a pair of walls located at opposite positions. In the cross section of the convex lens part, the protrusion includes a pair of edges located at opposite positions. The coating film is formed entirely between the pair of walls or entirely between the pair of edges in the recess or the protrusion.

In addition, a method of manufacturing the marker according to the embodiments includes: producing the convex lens part by injection molding with a transparent resin; and producing the coating film by applying a coating material to one or both of the first part and the second part.

The shape on the front surface side and the shape on the rear surface side of the convex lens part (optical component) are integrally formed by a metal mold by injection molding, and thus the shapes and the positions of the convex surface part and the first and the second parts are set with high precision. In addition, identical convex lens parts including the above-mentioned parts that are highly precisely set are produced by injection molding. Further, it is possible to precisely produce a large number of convex lens parts by preparing a metal mold corresponding to the convex lens parts even when the convex lens parts include a convex surface part having a shape including delicate shape variation such as the aspherical surface. Thus, it is possible to provide a marker which can be simply manufactured and can achieve observation of clearly patterned images.

In addition, the configuration in which the wall surfaces of a pair of walls are perpendicular to the rear surface is further advantageous from the viewpoint of increasing the clearness of the observed image.

In addition, the configuration in which the convex lens part is a cylindrical lens part and the first part is formed in a straight-line shape along a direction of a ridgeline of the cylindrical lens part is further advantageous from the viewpoint of clearly indicating the image, and the configuration in which the convex lens part is a lenticular lens part including a plurality of the cylindrical lens parts disposed parallel to one another is further favorable as a marker for one-direction.

In addition, the configuration in which the convex surface part is a part of an aspherical surface whose curvature radius increases as a distance of the aspherical surface from an optical axis of the convex lens part increases is further advantageous from the viewpoint of increasing the viewing angle to the optical axis for observing an image of a pattern.

In addition, the configuration in which in a cross section of the convex lens part in a direction orthogonal to the optical axis of the convex lens part, a ratio of a length of the first part to a length of the convex lens part is $1/100$ to $1/5$ is further advantageous from the viewpoint of projecting an image of a sufficiently clear and high-definition pattern to the convex surface part.

This application is entitled to and claims the benefit of Japanese Patent Application No. 2015-184894 dated Sep. 18, 2015, the disclosure of which including the specification, drawings and abstract is incorporated herein by reference in its entirety.

INDUSTRIAL APPLICABILITY

The marker according to the embodiments of the present invention is useful as a marker for recognizing the position and/or the orientation of an object and the like. In addition, the present invention is expected to contribute not only to development of the technical field of the marker, but also to development of various technical fields where it is desired to provide a pattern to the convex lens with high precision.

REFERENCE SIGNS LIST 10, 20, 30 Marker
11, 21 Lenticular lens part
31 Convex lens group
50 Metal mold
51 Upper mold
52 Lower mold
111, 211 Cylindrical lens part
112, 212, 312 Convex surface part
113, 313 Recess
114 Wall
115, 215, 315 Coating film
213 Protrusion
214 Edge
311 Convex lens part
511 Recessed line
521 Projected line

The invention claimed is:

1. A marker comprising:
a convex lens group made of a transparent resin and including:
a plurality of convex lens parts each of which includes a convex surface part disposed on a front surface side of each of the plurality of convex lens parts,
a first part disposed on a rear surface side of each of the plurality of convex lens parts, and
a second part disposed on the rear surface side of each of the plurality of convex lens parts, the first part being arranged corresponding to each convex surface part, the second part being a part other than the first part; and
a plurality of coating films formed only on either a plurality of first parts or a plurality of second parts,
wherein a positional relationship between each of the plurality of convex lens parts and each first part corresponding to each other differs among the plurality of convex lens parts in a direction perpendicular to optical axes of the plurality of convex lens parts, and
wherein the marker satisfies the following requirements (1) or (2):
(1) each first part is a recess and each second part is a protrusion,
in a cross section of the plurality of convex lens parts, the recess includes a pair of walls located at opposite positions,
in the cross section of the plurality of convex lens parts, the protrusion includes a pair of edges located at opposite positions, and
each coating film is formed entirely between the pair of walls of the recess or entirely between the pair of edges of the protrusion, and
(2) each first part is a protrusion and each second part is a recess,
in the cross section of the plurality of convex lens parts, the protrusion includes a pair of edges located at opposite positions,
in a cross section of the plurality of convex lens parts, the recess includes a pair of walls located at opposite positions, and
each coating film is formed entirely between the pair of edges of the protrusion of entirely between the pair of walls of the recess.

2. The marker according to claim 1, wherein wall surfaces of the pair of walls are perpendicular to the rear surface.

3. The marker according to claim 1,
wherein each of the plurality of convex lens parts is a cylindrical lens part; and
wherein each first part is formed in a straight-line shape along a direction of a ridgeline of the plurality of cylindrical lens parts.

4. The marker according to claim 3, wherein the convex lens group is a lenticular lens part including the plurality of the cylindrical lens parts disposed parallel to one another.

5. The marker according to claim 1, wherein each convex surface part is a part of an aspherical surface whose curvature radius increases as a distance of the aspherical surface from an optical axis of each of the plurality of convex lens parts increases.

6. The marker according to claim 1, wherein in a cross section of the plurality of convex lens parts in a direction orthogonal to the optical axis of the plurality of convex lens parts, a ratio of a length of each first part to a length of each of the plurality of convex lens parts is $1/100$ to $1/5$.

7. A method of manufacturing the marker according to claim 1, the method comprising:
producing the convex lens group including the plurality of convex lens parts by injection molding with the transparent resin; and
producing the plurality of coating films by applying a coating material to the plurality of first parts or the plurality of second parts.

8. An optical component that is the convex lens group according to claim 1.

9. A marker comprising:
a convex lens group made of a transparent resin and including:
- a plurality of convex lens parts each of which includes a convex surface part disposed on a front surface side of each of the plurality of convex lens parts,
- a first part disposed on a rear surface side of each of the plurality of convex lens parts, and
- a second part disposed on the rear surface side of each of the plurality of convex lens parts, the first part being arranged corresponding to each convex surface part, the second part being a part other than the first part;

a plurality of first coating films formed on a plurality of first parts; and
a plurality of second coating films formed on a plurality of second parts, each second coating film being optically discriminable from each first coating film,
wherein a positional relationship between each of the plurality of convex lens parts and each first part corresponding to each other differs among the plurality of convex lens parts in a direction perpendicular to optical axes of the plurality of convex lens parts, and
wherein the marker satisfies the following requirement (1) or (2):
(1) each first part is a recess and each second part is a protrusion,
in a cross section of the plurality of convex lens parts, the recess includes a pair of walls located at opposite positions,
in the cross section of the plurality of convex lens parts, the protrusion includes a pair of edges located at opposite positions, and
each first coating film is formed entirely between the pair of walls of the recess and each second coating film is formed entirely between the pair of edges of the protrusion, and
(2) each first part is a protrusion and each second part is a recess,
in the cross section of the plurality of convex lens parts, the protrusion includes a pair of edges located at opposite positions,
in a cross section of the plurality of convex lens parts, the recess includes a pair of walls located at opposite positions, and
each first coating film is formed entirely between the pair of edges of the protrusion and each second coating film is formed entirely between the pair of walls of the recess.

10. The marker according to claim 9, wherein wall surfaces of the pair of walls are perpendicular to the rear surface.

11. The marker according to claim 10, wherein the convex lens group is a lenticular lens part including the plurality of the cylindrical lens parts disposed parallel to one another.

12. The marker according to claim 9,
wherein each of the plurality of convex lens parts is a cylindrical lens part; and
wherein each first part is formed in a straight-line shape along a direction of a ridgeline of the plurality of cylindrical lens parts.

13. The marker according to claim 9, wherein each convex surface part is a part of an aspherical surface whose curvature radius increases as a distance of the aspherical surface from an optical axis of each of the plurality of convex lens parts increases.

14. The marker according to claim 9, wherein in a cross section of the plurality of convex lens parts in a direction orthogonal to the optical axis of the plurality of convex lens parts, a ratio of a length of each first part to a length of each of the plurality of convex lens parts is $1/100$ to $1/5$.

15. A method of manufacturing the marker according to claim 9, the method comprising:
producing the convex lens group including the plurality of convex lens parts by injection molding with the transparent resin; and
producing the plurality of first coating films and the plurality of second coating films by applying a first coating material to the plurality of first parts and applying a second coating material to the plurality of second parts.

16. An optical component that is the convex lens group according to claim 9.

* * * * *